United States Patent
Suzuki et al.

(10) Patent No.: US 11,898,053 B2
(45) Date of Patent: Feb. 13, 2024

(54) ACTIVE ENERGY RAY-CURABLE RESIN COMPOSITION, ANTI-FOGGING AND ANTI-FOULING LAMINATE, METHOD FOR PRODUCING SAME, ARTICLE, AND ANTI-FOGGING METHOD

(71) Applicant: Dexerials Corporation, Tokyo (JP)

(72) Inventors: Ryo Suzuki, Tokyo (JP); Shinobu Hara, Tokyo (JP); Mikihisa Mizuno, Tokyo (JP)

(73) Assignee: Dexerials Corporation, Tokyo (JP)

( * ) Notice: Subject to any disclaimer, the term of this patent is extended or adjusted under 35 U.S.C. 154(b) by 884 days.

(21) Appl. No.: 16/961,766

(22) PCT Filed: Oct. 17, 2019

(86) PCT No.: PCT/JP2019/040996
§ 371 (c)(1),
(2) Date: Jul. 13, 2020

(87) PCT Pub. No.: WO2020/085218
PCT Pub. Date: Apr. 30, 2020

(65) Prior Publication Data
US 2021/0363383 A1 Nov. 25, 2021

(30) Foreign Application Priority Data

Oct. 24, 2018 (JP) ................................ 2018-199821

(51) Int. Cl.
*C09D 175/14* (2006.01)
*G02B 1/18* (2015.01)
*C03C 17/28* (2006.01)
*C03C 17/34* (2006.01)
*C09D 5/00* (2006.01)

(52) U.S. Cl.
CPC ........ *C09D 175/14* (2013.01); *C03C 17/3405* (2013.01); *C09D 5/002* (2013.01); *G02B 1/18* (2015.01); *C03C 2217/75* (2013.01)

(58) Field of Classification Search
None
See application file for complete search history.

(56) References Cited

U.S. PATENT DOCUMENTS

| 2016/0243520 A1 | 8/2016 | Ukigai et al. |
| 2018/0118907 A1 | 5/2018 | Sakamoto et al. |

FOREIGN PATENT DOCUMENTS

| CN | 107206756 A | 9/2017 |
| CN | 107531029 A | 1/2018 |
| JP | 2000-194503 | 7/2000 |
| JP | 2009-243233 | 10/2009 |
| JP | 2010-095569 | 4/2010 |
| JP | 2012-072212 | 4/2012 |
| JP | 2012-144695 | 8/2012 |
| JP | 2015-028097 | 2/2015 |
| JP | 2016-044210 | 4/2016 |
| JP | 2016-172923 | 9/2016 |
| JP | 6133022 | 4/2017 |
| WO | 2016/093270 | 6/2016 |
| WO | 2016/175054 | 11/2016 |

OTHER PUBLICATIONS

Translation of WO 2016/175054.*
Japanese Office Action dated Feb. 14, 2019 issued in corresponding Japanese application No. 2018-199821.
International Search Report dated Dec. 17, 2019 issued in corresponding International Patent Application No. PCT/JP2019/040996.
Written Opinion of the International Search Authority dated Dec. 17, 2019 issued in corresponding International Patent Application No. PCT/JP2019/040996.
Extended European Search Report issued in corresponding European Application No. 19875236.2, dated Jul. 27, 2021.
Chinese Office action issued in corresponding Chinese Patent Application No. 201980013959.X, dated Oct. 20, 2022.
Chinese Office action issued in corresponding Chinese Patent Application No. 201980013959.X, dated Aug. 2, 2022.

* cited by examiner

*Primary Examiner* — Sheeba Ahmed
(74) *Attorney, Agent, or Firm* — Carmody Torrance Sandak & Hennessey LLP (57) ABSTRACT

An anti-fogging and anti-fouling laminate including: a substrate; and an anti-fogging and anti-fouling layer on the substrate, the anti-fogging and anti-fouling layer having a flat surface, wherein a hexadecane contact angle of the anti-fogging and anti-fouling layer is 10° or less, the anti-fogging and anti-fouling layer is a cured product of an active energy ray-curable resin composition, and the active energy ray-curable resin composition includes a hydrophilic monomer.

18 Claims, 1 Drawing Sheet

ACTIVE ENERGY RAY-CURABLE RESIN COMPOSITION, ANTI-FOGGING AND ANTI-FOULING LAMINATE, METHOD FOR PRODUCING SAME, ARTICLE, AND ANTI-FOGGING METHOD

TECHNICAL FIELD

The present invention relates to an anti-fogging and anti-fouling laminate that can be used in wet areas, a production method thereof, an article using the anti-fogging and anti-fouling laminate, an anti-fogging method using the anti-fogging and anti-fouling laminate, and an active energy ray curable resin composition applicable to formation of an anti-fogging and anti-fouling layer of the anti-fogging and anti-fouling laminate.

BACKGROUND ART

In a member used in wet areas such as bathroom, washroom, toilet, and kitchen, adhesion of tap water, soap, sebum, and oil stains (e.g., solvent ink) and drying of its adhesion products are repeated. As a result, scale, soap scum, sebum stain, and solvent ink adhere to the member. When a chemical such as a hair dye used in a wet area adheres to the member, the member is dyed. It is difficult to remove these stains through the regular cleaning, which results in deterioration of the appearance and the hygiene.

Therefore, in order to prevent stains from remaining on the surface of a wet area member, such techniques that an anti-fouling property is imparted to the surface of the wet area member have been proposed (for example, see PTL 1 to PTL 4).

However, in these proposed techniques, there was a problem that it is difficult to achieve all the anti-fouling property, the anti-fogging property, and the chemical resistance.

CITATION LIST

Patent Literature

PTL 1 Japanese Patent Application Laid-Open (JP-A) No. 2012-144695
PTL 2 Japanese Patent No. 6133022
PTL 3 Japanese Patent Application Laid-Open (JP-A) No. 2016-172923
PTL 4 Japanese Patent Application Laid-Open (JP-A) No. 2009-243233

SUMMARY OF INVENTION

Technical Problem

An object of the present invention is to solve the conventionally existing problems and to achieve the following object. That is, an object of the present invention is to provide an anti-fogging and anti-fouling laminate excellent in all the anti-fouling property, the anti-fogging property, and the chemical resistance, a method for producing the anti-fogging and anti-fouling laminate, an article including the anti-fogging and anti-fouling laminate, and an active energy ray-curable resin composition applicable to formation of an anti-fogging and anti-fouling layer of the anti-fogging and anti-fouling laminate.

Solution to Problem

Means for solving the problems are as follows. That is,
<1> An anti-fogging and anti-fouling laminate including:
a substrate; and
an anti-fogging and anti-fouling layer on the substrate, the anti-fogging and anti-fouling layer having a flat surface,
wherein a hexadecane contact angle of the anti-fogging and anti-fouling layer is 10° or less,
the anti-fogging and anti-fouling layer is a cured product of an active energy ray-curable resin composition, and
the active energy ray-curable resin composition includes a hydrophilic monomer.
<2> The anti-fogging and anti-fouling laminate according to <1>, further including:
a primer layer between the substrate and the anti-fogging and anti-fouling layer.
<3> The anti-fogging and anti-fouling laminate according to <1> or <2>, wherein the active energy ray-curable resin composition is free of a hydrophobic monomer.
<4> The anti-fogging and anti-fouling laminate according to any one of <1> to <3>,
wherein an amount of the hydrophilic monomer is more than 0% by mass but 10% by mass or less relative to non-volatile matter of the active energy ray-curable resin composition.
<5> The anti-fogging and anti-fouling laminate according to any one of <1> to <4>,
wherein the active energy ray-curable resin composition includes a bi- or more functional urethane (meth)acrylate.
<6> The anti-fogging and anti-fouling laminate according to any one of <1> to <5>,
wherein a surface free energy of the anti-fogging and anti-fouling layer is 30 mJ/m$^2$ or more but 65 mJ/m$^2$ or less.
<7> The anti-fogging and anti-fouling laminate according to any one of <1> to <6>,
wherein a water contact angle of the anti-fogging and anti-fouling layer is 30° or more but 90° or less.
<8> The anti-fogging and anti-fouling laminate according to any one of <1> to 5<7>,
wherein Martens hardness of the anti-fogging and anti-fouling layer is 200 N/mm$^2$ or more.
<9> The anti-fogging and anti-fouling laminate according to any one of <1> to <8>,
wherein a coefficient of kinetic friction of the anti-fogging and anti-fouling layer is 0.90 or less.
<10> The anti-fogging and anti-fouling laminate according to any one of <1> to <9>,
wherein the substrate is a mirror, and
b* value of reflection hue in the anti-fogging and anti-fouling layer is 5 or less.
<11> An article including:
the anti-fogging and anti-fouling laminate according to any one of <1> to <10> on a surface of the article.
<12> A method for producing the anti-fogging and anti-fouling laminate according to any one of <1> to <10>, the method including:
irradiating an uncured layer formed of the active energy ray-curable resin composition with ultraviolet rays under an atmosphere having an oxygen concentration of less than 1.0% by volume to form the anti-fogging and anti-fouling layer.
<13> An anti-fogging method including:
warming the anti-fogging and anti-fouling laminate according to any one of <1> to <10> to a temperature equal to or higher than normal temperature to improve an anti-fogging property of the anti-fogging and anti-fouling layer.
<14> An anti-fogging method including:
cleaning the anti-fogging and anti-fouling layer of the anti-fogging and anti-fouling laminate according to any one of <1> to <10> to maintain an anti-fogging property of the anti-fogging and anti-fouling layer.

<15> An active energy ray-curable resin composition including:

a hydrophilic monomer, wherein the active energy ray-curable resin composition is free of a hydrophobic monomer, and an amount of the hydrophilic monomer is more than 0% by mass but 10% by mass or less relative to non-volatile matter of the active energy ray-curable resin composition.

<16> The active energy ray-curable resin composition according to <15>, further including:

a bi- or more functional urethane (meth)acrylate.

<17> The active energy ray-curable resin composition according to <15> or <16>, wherein an anti-fogging and anti-fouling layer having a flat surface, which is obtained by curing the active energy ray-curable resin composition with active energy rays, has a hexadecane contact angle of 10° or less.

<18> The active energy ray-curable resin composition according to any one of <15> to <17>, wherein an anti-fogging and anti-fouling layer having a flat surface, which is obtained by curing the active energy ray-curable resin composition with active energy rays, has a surface free energy of 30 mJ/m$^2$ or more but 65 mJ/m$^2$ or less.

<19> The active energy ray-curable resin composition according to any one of <15> to <18>, wherein an anti-fogging and anti-fouling layer having a flat surface, which is obtained by curing the active energy ray-curable resin composition with active energy rays, has a water contact angle of 30° or more but 90° or less.

<20> The active energy ray-curable resin composition according to any one of <15> to <19>, wherein an anti-fogging and anti-fouling layer having a flat surface, which is obtained by curing the active energy ray-curable resin composition with active energy rays, has Martens hardness of 200 N/mm$^2$ or more.

<21> The active energy ray-curable resin composition according to any one of <15> to <20>, wherein an anti-fogging and anti-fouling layer having a flat surface, which is obtained by curing the active energy ray-curable resin composition with active energy rays, has a coefficient of kinetic friction of 0.90 or less.

<22> The active energy ray-curable resin composition according to any one of <15> to <21>, wherein b* value of reflection hue in an anti-fogging and anti-fouling layer having a flat surface is 5 or less, the anti-fogging and anti-fouling layer being obtained by curing the active energy ray-curable resin composition on a mirror that is a substrate with active energy rays.

Advantageous Effects of Invention

According to the present invention, it is possible to solve the conventionally existing problems, to achieve the following object, and to provide an anti-fogging and anti-fouling laminate excellent in all the anti-fouling property, the anti-fogging property, and the chemical resistance, a method for producing the anti-fogging and anti-fouling laminate, an article including the anti-fogging and anti-fouling laminate, and an active energy ray-curable resin composition applicable to formation of an anti-fogging and anti-fouling layer of the anti-fogging and anti-fouling laminate.

DESCRIPTION OF EMBODIMENTS (Anti-Fogging and Anti-Fouling Laminate)

An anti-fogging and anti-fouling laminate of the present invention includes at least a substrate and an anti-fogging and anti-fouling layer, and further includes other members such as a primer layer if necessary.

<Characteristics of Anti-Fogging and Anti-Fouling Laminate>

The anti-fogging and anti-fouling laminate has the following characteristics.

The anti-fogging and anti-fouling laminate includes an anti-fogging and anti-fouling layer having a flat surface.

A hexadecane contact angle of the anti-fogging and anti-fouling layer is 10° or less.

The anti-fogging and anti-fouling layer is a cured product of an active energy ray-curable resin composition.

The active energy ray-curable resin composition includes a hydrophilic monomer.

The anti-fogging and anti-fouling laminate is excellent in all the anti-fouling property, the anti-fogging property, and the chemical resistance when it has the aforementioned characteristics.

<Substrate>

The substrate is not particularly limited and may be appropriately selected depending on the intended purpose. Examples thereof include substrates made of a resin and inorganic substrates.

The substrate is, for example, a substrate used in a wet area. Equipment for wet areas, which includes such a substrate, is for example, equipment that has a function of supplying water, a function of draining water, and a function of supplying and draining water, and is required to be maintained to be hygienic. Examples thereof include water closets, dishwashers, washing machines, kitchen sinks, wash basins, lavatories, and bathtubs.

«Inorganic Substrate»

Examples of the inorganic substrate include metallic substrates, substrates made of glass, and substrates made of ceramic.

Examples of metal of the metallic substrate include copper, copper alloys, zinc, and steel.

The substrate made of glass is not particularly limited and may be appropriately selected depending on the intended purpose. Examples thereof include silica glass (silicate glass), soda-lime glass, and potash glass.

The substrate made of glass may be tempered glass, laminated glass, and heat-resistant glass.

A shape of the substrate made of glass is typically a form of plate, but may be any form such as a form of sheet and a form of curvature.

«Substrate Made of Resin»

A material of the substrate made of a resin is not particularly limited and may be appropriately selected depending on the intended purpose. Examples thereof include acrylonitrile-butadiene-styrene (ABS), polycarbonate (PC), polymethyl methacrylate (PMMA), polystyrene (PS), polypropylene (PP), modified polyphenylene ether (m-PPE), and PC/ABS alloy.

A shape of the substrate is not particularly limited and may be appropriately selected depending on the intended purpose.

A surface of the substrate (surface at a side of the anti-fogging and anti-fouling layer) may have glossiness.

To the surface of the substrate, matte patterns, hear lines, spin, and diamond cut may be applied.

The surface of the substrate may be subjected to plating. Examples of the plating include nickel plating, chromium plating, tin plating, tin alloy plating, zinc plating, copper plating, gold plating, and silver plating. These may be applied to form a single layer or may be applied in combination to form a plurality of layers.

<Primer Layer>

In order to improve adhesiveness between the anti-fogging and anti-fouling layer and the substrate, the primer layer may be provided between the substrate and the anti-fogging and anti-fouling layer.

When the primer layer is thin, an effect of improving adhesiveness is insufficient. Therefore, an average thickness of the primer layer is preferably 0.5 μm or more, more preferably from 1 μm to 20 μm, still more preferably from 1 μm to 10 μm, particularly preferably from 2 μm to 5 μm.

The average thickness of the primer layer falling within the preferable range hardly decreases the adhesiveness and can prevent exfoliation of the anti-fogging and anti-fouling layer even when it is exposed to a high-temperature vapor (e.g., 60° C. or more), a thermal shock (for example, a drastic change from −20° C. to 80° C.), and an alkaline detergent.

The average thickness can be determined by the following method.

The thickness of the primer layer is measured at any 10 portions using F20 film thickness measurement system (available from Filmetrics Japan, Inc.). An average of the measurements is defined as the average film thickness.

The primer layer can be formed by, for example, coating the active energy ray curable resin composition. That is, the primer layer is a cured product obtained by, for example, curing the active energy ray curable resin composition with active energy rays. The active energy ray curable resin composition is, for example, an active energy ray curable resin composition that includes at least urethane (meth) acrylate and a photopolymerization initiator and further includes other components such as a solvent if necessary.

The urethane (meth)acrylate is not particularly limited and may be appropriately selected depending on the intended purpose. Examples thereof include aliphatic urethane (meth)acrylates and aromatic urethane (meth)acrylates. Among them, aliphatic urethane (meth)acrylates are preferable.

Specific examples of the photopolymerization initiator include specific examples of the photopolymerization initiator that will be exemplified in the description of the below-described anti-fogging and anti-fouling layer.

Specific examples of the solvent include specific examples of the solvent that will be exemplified in the description of the below-described anti-fogging and anti-fouling layer.

Preferably, the active energy ray-curable resin composition further includes a tri- or more functional (meth)acrylate. Examples of the tri- or more functional (meth)acrylate include pentaerythritol tri(meth)acrylate, trimethylolpropane tri(meth)acrylate, trimethylolpropane ethoxy tri(meth)acrylate, glycerin ethoxy tri(meth)acrylate, glycerin propoxy tri(meth)acrylate, isocyanuric acid ethoxy tri(meth)acrylate, pentaerythritol tetra(meth)acrylate, pentaerythritol alkoxy tetra(meth)acrylate, ditrimethylolpropane tetra(meth)acrylate, and dipentaerythritol hexa(meth)acrylate.

Examples of the alkoxy include ethoxy and propoxy.

A method of the coating is not particularly limited and may be appropriately selected depending on the intended purpose. Examples thereof include wire bar coating, blade coating, spin coating, reverse roll coating, die coating, spray coating, roll coating, gravure coating, microgravure coating, lip coating, air knife coating, curtain coating, the comma coat method, and the dipping method.

<Anti-Fogging and Anti-Fouling Layer>

A hexadecane contact angle of the anti-fogging and anti-fouling layer is 10° or less.

The anti-fogging and anti-fouling layer is a cured product of an active energy ray-curable resin composition.

The anti-fogging and anti-fouling layer has a flat surface. Here, the phrase "having a flat surface" means that the surface does not have intentionally formed convex portions or concave portions. For example, regarding the anti-fogging and anti-fouling laminate, when the anti-fogging and anti-fouling layer is formed (when the cured product is formed), fine convex portions or concave portions formed through physical processing are not formed on the surface.

When the surface of the anti-fogging and anti-fouling layer does not have fine convex portions or concave portions, aqueous stains and/or oily stains (e.g., ink of permanent markers, finger prints, sweat, and cosmetics such as foundation cosmetics and UV protectors) hardly adhere to the surface. In addition, even if these stains adhere thereto, the stains can be easily removed with a sheet of tissue paper.

A surface free energy of the anti-fogging and anti-fouling layer is preferably 30 mJ/m$^2$ or more but 65 mJ/m$^2$ or less.

A water contact angle of the anti-fogging and anti-fouling layer is 30° or more but 90° or less.

Martens hardness of the anti-fogging and anti-fouling layer is preferably 200 N/mm$^2$ or more.

A coefficient of kinetic friction of the anti-fogging and anti-fouling layer is preferably 0.90 or less.

«Hexadecane Contact Angle»

The hexadecane contact angle is 10° or less, more preferably 9° or less, particularly preferably 8° or less. The lower limit of the hexadecane contact angle is not particularly limited and may be appropriately selected depending on the intended purpose. For example, the hexadecane contact angle is preferably 1° or more, more preferably 3° or more.

The hexadecane contact angle is measured using, for example, an automatic contact angle meter DM-501 (available from Kyowa Interface Science Co., Ltd.) under the following conditions.

Amount of hexadecane added dropwise=1 μL

Measurement temperature=25° C.

Twenty seconds after hexadecane is added dropwise, the contact angle is measured at any 10 portions on a test sample, and an average of the measurements is defined as the "hexadecane contact angle".

«Surface Energy»

A surface energy of the anti-fogging and anti-fouling layer is not particularly limited and may be appropriately selected depending on the intended purpose. The surface energy is preferably 30 mJ/m$^2$ or more but 65 mJ/m$^2$ or less, more preferably 30 mJ/m$^2$ or more but 55 mJ/m$^2$ or less, particularly preferably 35 J/m$^2$ or more but 45 mJ/m$^2$ or less.

The surface energy can be measured by, for example, the following method.

The surface energy is calculated by the method of Kaelble-Uy by measuring contact angles of water and hexadecane using an automatic contact angle meter DM-501 (available from Kyowa Interface Science Co., Ltd.).

«Water Contact Angle»

The water contact angle is measured under the following conditions.

Amount of distilled water added dropwise=2 μL
Measurement temperature=25° C.

Five seconds after water is added dropwise, the contact angle is measured at any 10 portions on a test sample, and an average of the measurements is defined as the "water contact angle".

«Hexadecane Contact Angle»

The hexadecane contact angle is measured under the following conditions.

Amount of hexadecane added dropwise=1 μL
Measurement temperature=25° C.

Twenty seconds after hexadecane is added dropwise, the contact angle is measured at any 10 portions on a test sample, and an average of the measurements is defined as the "hexadecane contact angle".

The theoretical formula of Kaelble-Uy is a method for quantitatively determining a surface energy γ of a solid.

In the theoretical formula of Kaelble-Uy, assuming that the surface energy γ is composed of a dispersion component $\gamma^d$ and a polar component R, the total surface free energy γ is represented by the following Formula (1).

$$\gamma = \gamma^d + \gamma^p \quad \text{Formula (1)}$$

The following formula (2) is satisfied, where a surface energy on the surface of liquid is represented by $\gamma_L$, the surface of the solid is represented by $\gamma_S$, and the contact angle is represented by θ.

$$\gamma_L(1+\cos\theta) = 2\sqrt{\gamma_S^d \gamma_L^d} + 2\sqrt{\gamma_S^p \gamma_L^p} \quad \text{Formula 2}$$

Therefore, two kinds of liquids whose component $\gamma^L$ is known are used to measure the respective contact angles θ, and simultaneous equations in connection with $\gamma_S^d$ and $\gamma_S^p$ are solved to determine $\gamma_S$.

«Water Contact Angle»

The water contact angle is not particularly limited and may be appropriately selected depending on the intended purpose. The water contact angle is preferably 30° or more but 90° or less, more preferably 45° or more but 85° or less, particularly preferably 60° or more but 75° or less.

The water contact angle is measured using, for example, an automatic contact angle meter DM-501 (available from Kyowa Interface Science Co., Ltd.) under the following conditions.

Amount of distilled water added dropwise=2 μL
Measurement temperature=25° C.

Five seconds after water is added dropwise, the contact angle is measured at any 10 portions on a test sample, and an average of the measurements is defined as the "water contact angle".

«Martens Hardness»

The Martens hardness of the anti-fogging and anti-fouling layer is not particularly limited and may be appropriately selected depending on the intended purpose. The Martens hardness is preferably 200 N/mm² or more, and is, for example, 200 N/mm² or more but 300 N/mm² or less.

The Martens hardness of the anti-fogging and anti-fouling layer can be measured by, for example, the following method.

The Martens hardness of the anti-fogging and anti-fouling layer in the anti-fogging and anti-fouling laminate is measured using PICODENTOR HM500 (available from Fischer Instruments) under the following conditions.

Load=1 mN/20 s
Needle=diamond cone having a face angle of 136°

The Martens hardness is measured at any 10 portions and an average of the measurements is defined as the "Martens hardness".

«Coefficient of Kinetic Friction»

A coefficient of kinetic friction of the anti-fogging and anti-fouling layer is not particularly limited and may be appropriately selected depending on the intended purpose. The coefficient of kinetic friction is preferably 0.90 or less. The coefficient of kinetic friction is, for example, 0.10 or more but 0.40 or less, and 0.15 or more but 0.30 or less.

The coefficient of kinetic friction of the anti-fogging and anti-fouling layer can be measured by, for example, the following method.

The coefficient of kinetic friction is measured using Triboster TS501 (available from Kyowa Interface Science Co., Ltd). Then, BEMCOT (registered trademark) M-3II (available from Asahi Kasei Corp.) is attached to a surface contact piece with a piece of double-sided tape. Then, the measurement is performed twelve times under the following conditions: measurement load of 50 g/cm²; measurement speed of 1.7 mm/s; and measurement distance of 20 mm. An average of the measurements is defined as the "coefficient of kinetic friction".

When the anti-fogging and anti-fouling layer has the Martens hardness of 200 N/mm² or more and the coefficient of kinetic friction of 0.40 or less, the anti-fogging and anti-fouling layer is hardly scratched. Therefore, even when the anti-fogging and anti-fouling layer is repeatedly cleaned for a long period of time, scratches or marks are hardly left, the anti-fouling property and the appearance remain unchanged, and the durability is high. As a result, the scratch resistance is excellent and stains of a hair dye hardly adhere thereto.

«Active Energy Ray-Curable Resin Composition»

The anti-fogging and anti-fouling layer is a cured product of the active energy ray-curable resin composition.

The active energy ray-curable resin composition includes a hydrophilic monomer.

The active energy ray-curable resin composition is preferably free of a hydrophobic monomer.

The active energy ray-curable resin composition preferably includes a bi- or more functional urethane (meth)acrylate.

The active energy ray-curable resin composition preferably includes a crosslinking agent.

The active energy ray-curable resin composition may include, for example, a polymerization initiator and a solvent.

<<<Hydrophilic Monomer>>>

The hydrophilic monomer includes a hydrophilic group and a (meth)acryloyl group.

Examples of the hydrophilic group include a polyether group, a hydroxyl group, and an amide group. The amide group refers to —CO—NH— group. Even when a monomer includes —O—CO—NH— group, such a monomer belongs to the hydrophilic monomer.

Examples of the polyether in the polyether group include polyalkylene glycol, polyalkylene oxide, polyalkylene alkyl phenyl ether, polyphenylene oxide, polysulfone, and chlorinated polyether.

The number of carbon atoms of the alkylene group in the polyether is preferably 1 or more but 12 or less, more preferably 1 or more but 6 or less. Specific examples thereof include methylene (the number of carbon atoms: 1), 1,2-ethylene (the number of carbon atoms: 2), 1,3-propylene (the number of carbon atoms: 3), 1,2-propylene (the number of carbon atoms: 3), and 1,4-butylene (the number of carbon atoms: 4). The alkylene group in the polyether may be composed of two or more kinds of the aforementioned alkylene groups.

The hydrophilic monomer may be a commercially available product. Examples of the commercially available product include: UV-3535 [polyether having a (meth)acryloyl group (UV reactive group-containing modified polyether)] (available from BYK); and FTERGENT 602A and FTERGENT 681 (available from NEOS COMPANY LIMITED).

Here, FTERGENT 681 (available from NEOS COMPANY LIMITED) includes a hydroxyl group and an amide group, and is generally described as an oligomer containing a fluorine-containing group, a hydrophilic group/lipophilic group, and a UV reactive group.

Inclusion of the hydrophilic monomer in the active energy ray-curable resin composition achieves an excellent chemical resistance and can suppress deterioration even when an alkaline detergent is used. Inclusion of a (meth)acrylate group makes it possible to fix the active energy ray-curable resin composition on the surface through UV curing, can maintain functions even when cleaning is repeatedly performed, and can maintain the visibility, the appearance, and the cleanliness for a long period of time.

An amount of the hydrophilic monomer in the active energy ray-curable resin composition is not particularly limited and may be appropriately selected depending on the intended purpose. The amount thereof is preferably more than 0% by mass but 10% by mass or less, more preferably 0.001% by mass or more but 10% by mass or less, still more preferably 0.001% by mass or more but 5.0% by mass or less, yet more preferably 0.01% by mass or more but 5.0% by mass or less, particularly preferably 0.01% by mass or more but 3.0% by mass or less, relative to non-volatile matter of the active energy ray-curable resin composition. When the amount thereof is less than 0.001% by mass, the anti-fouling property becomes insufficient, variations in film thickness in the plane become large, and the appearance may be deteriorated due to uneven interference. When the amount thereof is more than 10% by mass, the hardness of the cured product may become insufficient.

<<<Bi- or More Functional Urethane (Meth)Acrylate>>>

Examples of the bi- or more functional urethane (meth)acrylate include aliphatic urethane (meth)acrylates and aromatic urethane (meth)acrylates.

The bi- or more functional urethane (meth)acrylate does not have a structure derived from polysiloxane.

When the active energy ray-curable resin composition includes the bi- or more functional urethane (meth)acrylate, the hardness can be imparted to the cured product and the anti-fogging and anti-fouling layer can be prevented from being contaminated by a colorant.

The bi- or more functional urethane (meth)acrylate is a material including an urethane bond and two or more (meth)acryloyl groups in one molecule. The material can be used without any particular limitation.

The bi- or more functional urethane (meth)acrylate can be obtained by, for example, reacting a hydroxy compound having at least two (meth)acryloyl groups with isocyanate.

Examples of the isocyanate include polyisocyanate.

The aliphatic urethane (meth)acrylate can be obtained by, for example, reacting a hydroxy compound having at least two (meth)acryloyl groups with an aliphatic isocyanate. Examples of the aliphatic isocyanate include aliphatic diisocyanates and aliphatic triisocyanates.

The aromatic urethane (meth)acrylate can be obtained by, for example, reacting a hydroxy compound having at least two (meth)acryloyl groups with an aromatic isocyanate. Examples of the aromatic isocyanate include aromatic diisocyanates and aromatic triisocyanates.

An amount of the bi- or more functional urethane (meth)acrylate in the active energy ray-curable resin composition is preferably 40% by mass or more but 95% by mass or less relative to non-volatile matter in the active energy ray-curable resin composition.

<<<Crosslinking Agent>>>

The crosslinking agent is a bi- or more functional (meth)acrylate. When crosslinking agent may be a tri- or more functional (meth)acrylate.

The crosslinking agent has an acryl equivalent of less than 400.

The crosslinking agent is different from the hydrophilic monomer, the bi- or more functional urethane (meth)acrylate, and the hydrophobic monomer.

The crosslinking agent is free of fluorine and silicon.

The acryl equivalent means mass of a monomer per 1 mol of a (meth)acryl group, and can be obtained by dividing a molecular weight of the monomer by the number of (meth)acryl groups [may be referred to as a (meth)acryloyl group] per one molecule of the monomer.

Here, examples of the crosslinking agent and their acryl equivalents are presented below.

TABLE 1

|  | Material | Molecular weight | Number of acryl groups per one molecule | Acryl equivalent |
|---|---|---|---|---|
| Crosslinking agent | A-TMM-3 | 298 | 3 | 99.3 |
|  | A-TMPT | 296 | 3 | 98.7 |
|  | A-TMMT | 352 | 4 | 88 |
|  | A-DPH | 578 | 6 | 96.3 |
|  | A-GLY-9E | 811 | 3 | 270.3 |
|  | EBECRYL 40 | 571 | 4 | 142.8 |
|  | A-DCP | 304 | 2 | 152 |

Details of the crosslinking agents presented in Table 1 are as follows.

A-TMM-3: Pentaerythritol triacrylate (triester: 37%), available from Shin Nakamura Chemical Co., Ltd.

A-TMPT: Trimethylolpropane triacrylate, available from Shin Nakamura Chemical Co., Ltd.

A-TMMT: Pentaerythritol tetraacrylate, available from Shin Nakamura Chemical Co., Ltd.

A-DPH: Dipentaerythritol hexaacrylate, available from Shin Nakamura Chemical Co., Ltd.

A-GLY-9E: Ethoxylated glycerin triacrylate (EO: 9 mol), available from Shin Nakamura Chemical Co., Ltd.

EBECRYL 40: Pentaerythritol alkoxy tetraacrylate, available from DAICEL-ALLNEX LTD.

A-DCP: Tricyclodecane dimethanol diacrylate, available from Shin Nakamura Chemical Co., Ltd.

An amount of the crosslinking agent in the active energy ray-curable resin composition is not particularly limited and may be appropriately selected depending on the intended purpose. The amount thereof is preferably 5% by mass or more but 60% by mass or less, more preferably 15% by mass or more but 50% by mass or less, relative to non-volatile matter in the active energy ray-curable resin composition.

A total amount of the bi- or more functional urethane (meth)acrylate and the crosslinking agent in the active energy ray-curable resin composition is not particularly limited and may be appropriately selected depending on the intended purpose. The total amount thereof is preferably 70% by mass or more but 99% by mass or less, more preferably 80% by mass or more but 98% by mass or less, particularly preferably 90% by mass or more but 97% by mass or less, relative to the non-volatile matter in the active energy ray-curable resin composition.

The total amount of the bi- or more functional urethane (meth)acrylate and the crosslinking agent in the active energy ray-curable resin composition is not particularly limited and may be appropriately selected depending on the intended purpose. The total amount thereof is preferably 75% by mass or more but less than 100% by mass, more preferably 85% by mass or more but 99.999% by mass or less, particularly preferably 95% by mass or more but 99.99% by mass or less, relative to a total amount of monomers in the active energy ray-curable resin composition.

Note that, the total amount of monomers in the active energy ray-curable resin composition does not exceed 100% by mass.

<<<Hydrophobic Monomer>>>

The hydrophobic monomer includes a water-repellent molecular structure. Examples of the water-repellent molecular structure of the present invention include structures including fluorine or silicon. Specific examples thereof include fluoroalkyl structures, perfluoropolyether structures, and dimethylsiloxane structures.

When the active energy ray-curable resin composition includes the hydrophobic monomer, it is difficult for a hexadecane contact angle of the anti-fogging and anti-fouling layer to be 10° or less.

Note that, a bi- or more functional urethane (meth)acrylate having a structure derived from polysiloxane belongs to the hydrophobic monomer among the bi- or more functional urethane (meth)acrylate and the hydrophobic monomer.

Here, the hydrophilic monomer includes a hydrophilic group and a (meth)acryloyl group. When a monomer corresponds to the hydrophilic monomer and the hydrophobic monomer, such a monomer corresponds to the hydrophilic monomer in the present invention. That is, the hydrophobic monomer does not include the hydrophilic group and has the water-repellent molecular structure.

For example, FTERGENT 681 (available from NEOS COMPANY LIMITED, oligomer containing a fluorine-containing group, a hydrophilic group/lipophilic group, and a UV reactive group) belongs to the hydrophilic monomer, not to the hydrophobic monomer, in the present invention.

The hydrophobic monomer is, for example, (meth)acrylate. That is, the hydrophobic monomer is, for example, (meth)acrylate having a water-repellent molecular structure.

The hydrophobic monomer is preferably (meth)acrylate including a perfluoropolyether group. Compounds including repeating units of —(O—$CF_2CF_2$)—, —(O—$CF_2CF_2CF_2$)—, or —(O—$CF_2C(CF_3)F$)— as a perfluoropolyether group are preferable.

Examples of a commercially available product of the hydrophobic monomer include BYK-UV3500 (available from BYK), Fclear KD3510UV (available from KANTO DENKA KOGYO CO., LTD.), EBECRYL 8110 (available from DAICEL-ALLNEX LTD.), DAC-HP (available from DAIKIN INDUSTRIES, LTD), Fluorolink AD1700 (available from Solvay Specialty Polymers), Fluorolink MD700 (available from Solvay Specialty Polymers), CN4000 (available from SARTOMER), and KY-1203 (available from Shin-Etsu Chemical Co., Ltd.).

<<<Photopolymerization Initiator>>>

Examples of the photopolymerization initiator include photoradical polymerization initiators, photo-acid generating agents, bisazido compounds, hexamethoxymethylmelamine, and tetramethoxy glycoluril.

The photoradical polymerization initiator is not particularly limited and may be appropriately selected depending on the intended purpose. Examples thereof are presented as follows.

1-Hydroxy-cyclohexyl-phenyl-ketone
2-Hydroxy-1-{4-[4-(2-hydroxy-2-methyl-propionyl)-benzil]phenyl}-2-methyl-propan-1-one
2,2-Dimethoxy-1,2-diphenylethan-1-one
2-Hydroxy-2-methyl-1-phenyl-propan-1-one
1-[4-(2-Hydroxy-ethoxy)-phenyl]-2-hydroxy-2-methyl-1-propan-1-one
Mixture of oxy-phenyl-acetic acid 2-[2-oxo-2-phenyl-acetoxy-ethoxy]-ethyl ester and oxy-phenyl-acetic acid 2-[2-hydroxy-ethoxy]-ethyl ester
2,4,6-Trimethylbenzoyl-diphenyl-phosphine oxide
2-Methyl-1-(4-methylthiophenyl)-2-morpholinopropan-1-one
Ethanone,1-[9-ethyl-6-(2-methylbenzoyl)-9H-carbazol-3-yl]-,1-(O-acetyloxime)

The photopolymerization initiator preferably includes no nitrogen atom as a constituent element in order to prevent yellowing in appearance.

Meanwhile, in order to prevent yellowing in appearance, the photopolymerization initiator preferably includes only C, H, and O, or only C, H, P, and O, as constituent elements.

An amount of the photopolymerization initiator in the active energy ray curable resin composition is not particularly limited and may be appropriately selected depending on the intended purpose. However, the amount thereof is preferably 0.1% by mass or more but 10% by mass or less, more preferably 0.1% by mass or more but 5% by mass or less, particularly preferably 1% by mass or more but 5% by mass or less, relative to non-volatile matter of the active energy ray-curable resin composition.

<<<Solvent>>>

The solvent is not particularly limited and may be appropriately selected depending on the intended purpose. Examples thereof include organic solvents.

Examples of the organic solvent include aromatic solvents, alcohol-based solvents, ester-based solvents, ketone-based solvents, glycol ether-based solvents, glycol ether ester-based solvents, chlorine-based solvents, ether-based solvents, N-methylpyrrolidone, dimethylformamide, dimethylsulfoxide, and dimethylacetamide.

As the solvent, a solvent having a boiling point of 80° C. or more is preferable for the purpose of obtaining an anti-fogging and anti-fouling layer having more excellent appearance.

Examples of the solvent having a boiling point of 80° C. or more include propylene glycol monomethylether.

An amount of the solvent in the active energy ray curable resin composition is not particularly limited and may be appropriately selected depending on the intended purpose.

The active energy ray curable resin composition is cured by irradiation of active energy rays. The active energy rays are not particularly limited and may be appropriately selected depending on the intended purpose. Examples thereof include electron beams, ultraviolet rays, infrared rays, laser beams, visible rays, ionizing radiation (e.g., X rays, α: rays, β rays, and γ rays), microwave, and high-frequency wave.

«Average Thickness»

An average thickness of the anti-fogging and anti-fouling layer is not particularly limited and may be appropriately selected depending on the intended purpose. The average thickness thereof is preferably 1 μm or more, more preferably 1 μm or more but 15 μm or less.

The average thickness is determined by the following method.

The film thickness of the anti-fogging and anti-fouling layer is measured at any 10 portions using F20 film thickness measurement system (available from Filmetrics Japan, Inc.). An average of the measurements is defined as the average film thickness.

Preferably, the substrate is a mirror, and b* value of reflection hue in the anti-fogging and anti-fouling layer is 5 or less, in the anti-fogging and anti-fouling laminate. The b* value of reflection hue can be measured by, for example, the following method.

The 5° regular reflectance spectrum is measured using UV-Visible/NIR Spectrophotometer UH4150 (available from Hitachi High-Tech Science Corporation) within the rage of from 340 nm to 800 nm, followed by calculating the reflection b*.

Here, one example of the anti-fogging and anti-fouling laminate will be described.

Figure 1:
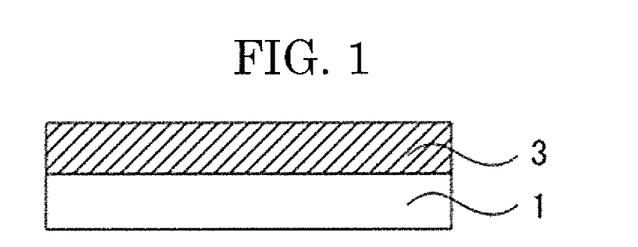
FIG. 1 is a schematic cross-sectional view of an example of an anti-fogging and anti-fouling laminate of the present invention.

FIG. 1 is a schematic cross-sectional view of an example of an anti-fogging and anti-fouling laminate of the present invention.

The anti-fogging and anti-fouling laminate of FIG. 1 includes a substrate 1 and an anti-fogging and anti-fouling layer 3.

Figure 2:
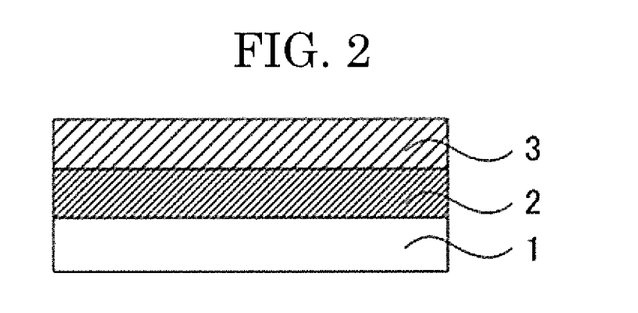
FIG. 2 is a schematic cross-sectional view of another example of an anti-fogging and anti-fouling laminate of the present invention.

FIG. 2 is a schematic cross-sectional view of another example of an anti-fogging and anti-fouling laminate of the present invention.

The anti-fogging and anti-fouling laminate of FIG. 2 includes a substrate 1, a primer layer 2, and an anti-fogging and anti-fouling layer 3.

(Method for Producing Anti-Fogging and Anti-Fouling Laminate)

A method of the present invention for producing an anti-fogging and anti-fouling laminate includes at least an anti-fogging and anti-fouling layer forming step, preferably includes a primer layer forming step, and further includes other steps if necessary.

The method of the present invention for producing an anti-fogging and anti-fouling laminate is a suitable method for producing the anti-fogging and anti-fouling laminate of the present invention.

<Primer Layer Forming Step>

The primer layer forming step is not particularly limited and may be appropriately selected depending on the intended purpose, so long as it is a step of forming the primer layer. Examples thereof include a step where an active energy ray curable resin composition for forming a primer layer is coated on the substrate, followed by irradiating it with ultraviolet rays, to form the primer layer.

<Anti-Fogging and Anti-Fouling Layer Forming Step>

The anti-fogging and anti-fouling layer forming step is not particularly limited and may be appropriately selected depending on the intended purpose, so long as it is a step of irradiating, with ultraviolet rays, an uncured layer formed of the active energy ray curable resin composition under an atmosphere having an oxygen concentration of less than 0.1% by volume, to form the anti-fogging and anti-fouling layer.

Irradiation of ultraviolet rays under the atmosphere having an oxygen concentration of less than 0.1% by volume when the anti-fogging and anti-fouling layer is formed makes the curability excellent. As a result, an anti-fogging and anti-fouling layer having a low coefficient of kinetic friction can be obtained.

Examples of the atmosphere having an oxygen concentration of less than 0.1% by volume include inert gas atmospheres such as nitrogen atmosphere.

(Active Energy Ray-Curable Resin Composition)

An active energy ray-curable resin composition of the present invention includes at least a hydrophilic monomer, preferably includes a bi- or more functional urethane (meth)acrylate, and further includes other components such as a crosslinking agent, a polymerization initiator, and a solvent if necessary.

The active energy ray-curable resin composition is free of a hydrophobic monomer.

An amount of the hydrophilic monomer in the active energy ray-curable resin composition is more than 0% by mass but 10% by mass or less relative to non-volatile matter of the active energy ray-curable resin composition.

Details of the hydrophilic monomer, the bi- or more functional urethane (meth)acrylate, the crosslinking agent, the hydrophobic monomer, the photopolymerization initiator, and the solvent are the same as the details of the hydrophilic monomer, the bi- or more functional urethane (meth)acrylate, the crosslinking agent, the hydrophobic monomer, the photopolymerization initiator, and the solvent in the description of the anti-fogging and anti-fouling layer of the anti-fogging and anti-fouling laminate. The same is applicable to preferable embodiments.

An anti-fogging and anti-fouling layer having a flat surface, which is obtained by curing the active energy ray-curable resin composition with active energy rays, preferably has a hexadecane contact angle of 10° or less.

Details and preferable embodiments of the hexadecane contact angle are the same as the details and the preferable embodiments of the hexadecane contact angle of the anti-fogging and anti-fouling layer of the anti-fogging and anti-fouling laminate of the present invention.

An anti-fogging and anti-fouling layer having a flat surface, which is obtained by curing the active energy ray-curable resin composition with active energy rays, preferably has a surface free energy of 30 mJ/m$^2$ or more but 65 mJ/m$^2$ or less.

Details and preferable embodiments of the surface free energy are the same as the details and the preferable embodiments of the surface free energy of the anti-fogging and anti-fouling layer of the anti-fogging and anti-fouling laminate of the present invention.

An anti-fogging and anti-fouling layer having a flat surface, which is obtained by curing the active energy ray-curable resin composition with active energy rays, preferably has a water contact angle of 30° or more but 90° or less.

Details and preferable embodiments of the water contact angle are the same as the details and the preferable embodiments of the water contact angle of the anti-fogging and anti-fouling layer of the anti-fogging and anti-fouling laminate of the present invention.

An anti-fogging and anti-fouling layer having a flat surface, which is obtained by curing the active energy ray-curable resin composition with active energy rays, preferably has Martens hardness of 200 N/mm² or more.

Details and preferable embodiments of the Martens hardness are the same as the details and the preferable embodiments of the Martens hardness of the anti-fogging and anti-fouling layer of the anti-fogging and anti-fouling laminate of the present invention.

An anti-fogging and anti-fouling layer having a flat surface, which is obtained by curing the active energy ray-curable resin composition with active energy rays, preferably has a coefficient of kinetic friction of 0.90 or less.

Details and preferable embodiments of the coefficient of kinetic friction are the same as the details and the preferable embodiments of the coefficient of kinetic friction of the anti-fogging and anti-fouling layer of the anti-fogging and anti-fouling laminate of the present invention.

The b* value of reflection hue in an anti-fogging and anti-fouling layer having a flat surface is preferably 5 or less, the anti-fogging and anti-fouling layer being obtained by curing the active energy ray-curable resin composition on a mirror that is a substrate with active energy rays.

Details and preferable embodiments of the b* value of reflection hue are the same as the details and the preferable embodiments of the b* value of the reflection hue of the anti-fogging and anti-fouling layer of the anti-fogging and anti-fouling laminate of the present invention.
(Article)

An article of the present invention includes the anti-fogging and anti-fouling laminate of the present invention, and further includes other members if necessary.

The article is not particularly limited and may be appropriately selected depending on the intended purpose. The article is preferably such equipment for wet areas that the anti-fogging and anti-fouling laminate of the present invention can exhibit its effects. Examples of the equipment for wet areas include equipment that has, for example, a function of supplying water, a function of draining water, and a function of supplying and draining water and is required to be maintained to be hygienic. Specific examples thereof include water closets, dishwashers, washing machines, kitchen sinks, wash basins, lavatories, and bathtubs.

The anti-fogging and anti-fouling laminate may be formed on a part of the article for wet areas or may be formed on the whole article for wet areas.
(Anti-Fogging Method)
<Anti-Fogging Method (Part 1)>

One aspect of an anti-fogging method of the present invention is an anti-fogging method for improving an anti-fogging property of the anti-fogging and anti-fouling layer by warming the anti-fogging and anti-fouling laminate of the present invention to a temperature equal to or higher than normal temperature.

Warming the anti-fogging and anti-fouling layer to a temperature equal to or higher than normal temperature improves a fogging property, and can prevent cloudiness of the anti-fogging and anti-fouling layer for a certain time or longer.

It is believed that the reason why the warming improves the anti-fogging property is because the warming suppresses condensation on the surface of the anti-fogging and anti-fouling layer and moisture is effectively repeatedly absorbed and released.

Examples of the method of the warming include a method by maintaining an atmosphere to 30° C. or more and a method by applying hot water of 30° C. or more to the anti-fogging and anti-fouling layer.
<Anti-Fogging Method (Part 2)>

Another aspect of the anti-fogging method of the present invention is an anti-fogging method where the anti-fogging and anti-fouling layer of the anti-fogging and anti-fouling laminate of the present invention is cleaned to maintain an anti-fogging property of the anti-fogging and anti-fouling layer.

When scale or oily stains are attached on the surface of the anti-fogging and anti-fouling layer, the anti-fogging property is decreased. Therefore, cleaning the anti-fogging and anti-fouling layer makes it possible to maintain the anti-fogging property of the anti-fogging and anti-fouling layer.

A method of the cleaning is not particularly limited and may be appropriately selected depending on the intended purpose. Examples thereof include wiping with a sponge. Examples of the sponge include commercially available urethane sponges and melamine sponges. When the sponge is used for the wiping, the sponge may be wetted with tap water or a detergent (e.g., commercially available neutral detergents, alkaline detergents, and acidic detergents) may be applied to the sponge.

EXAMPLES

Hereinafter, the present invention will be described by way of Examples. However, the present invention should not be construed as being limited to these Examples.
<Average Thickness>

The film thickness of the anti-fogging and anti-fouling layer and the film thickness of the primer layer were measured at any 10 portions using F20 film thickness measurement system (available from Filmetrics Japan, Inc.). An average of the measurements was defined as the average film thickness.
<Adhesiveness>

The cross-cut test was performed according to JIS K5400. The number of squares that remained without being peeled per 100 squares was counted.

When the squares were not peeled (100 squares per 100 squares remained), such a case was presented as "100/100". When all the squares were peeled (no square remained per 100 squares), such a case was presented as "0/100".
<Surface Energy>

The surface energy was calculated by the method of Kaelble-Uy by measuring contact angles of water and hexadecane using an automatic contact angle meter DM-501 (available from Kyowa Interface Science Co., Ltd.).
«Water Contact Angle»

The water contact angle was measured under the following conditions.

Amount of distilled water added dropwise=2 μL
Measurement temperature=25° C.

Five seconds after water was added dropwise, the contact angle was measured at any 10 portions on a test sample, and an average of the measurements was defined as the "water contact angle".
«Hexadecane Contact Angle»

The hexadecane contact angle was measured under the following conditions.

Amount of hexadecane added dropwise=1 μL
Measurement temperature=25° C.

Twenty seconds after hexadecane was added dropwise, the contact angle was measured at any 10 portions on a test sample, and an average of the measurements was defined as the "hexadecane contact angle".

<Martens Hardness>

The Martens hardness of a test sample was measured using PICODENTOR HM500 (available from Fischer Instruments) under the following conditions.

Load=1 mN/20 s

Needle=diamond cone having a face angle of 136°

The Martens hardness was measured at any 10 portions and an average of the measurements was defined as the "Martens hardness".

<Coefficient of Kinetic Friction>

The coefficient of kinetic friction was measured using Triboster TS501 (available from Kyowa Interface Science Co., Ltd). Then, BEMCOT (registered trademark) M-3II (available from Asahi Kasei Corp.) was attached to a surface contact piece with a piece of double-sided tape. Then, the measurement was performed twelve times under the following conditions: measurement load of 50 g/cm$^2$; measurement speed of 1.7 mm/s; and measurement distance of 20 mm. An average of the measurements was defined as the "coefficient of kinetic friction".

<Visibility after Shower>

In the case of a mirror, shower of hot water was applied to a leaned test sample for 3 seconds. Then, the test sample was visually observed, and was evaluated based on the following evaluation criteria.

[Evaluation Criteria]

Good: The visibility was good.

Bad: Many drops of water remained, which interfered the visibility.

<Removability of Scale>

Tap water was sprayed to a test sample, followed by drying at 50° C. This step was repeated 60 times. The test sample was wiped with urethane sponge (yellow side of Scotch-Brite antibacterial urethane sponge scourer S-21KS, available from 3M) wetted with water. Then, the test sample was visually observed and was evaluated based on the following evaluation criteria.

[Evaluation Criteria]

Good: Scale could be cleaned and removed. No scratch was found.

Bad: Scale remained or some scratches were found.

<Scratch Resistance>

A test sample was wiped with urethane sponge (yellow side of Scotch-Brite antibacterial urethane sponge scourer S-21KS, available from 3M) wetted with water at a load of 300 gf/cm$^2$ 15.000 times back and forth. Then, the test sample was visually observed and was evaluated based on the following evaluation criteria.

[Evaluation Criteria]

Good: The test sample had no abnormality.

Bad: The test sample was scratched.

<Alkali Resistance>

A mold removing agent (Kabikiller, available from Johnson Company, Limited) was applied to a test sample, and the test sample was left to stand for 24 hours. The test sample was washed with water, followed by wiping it with a clean cloth to evaluate the surface free energy and the coefficient of kinetic friction. In addition, the appearance and the removability of scale were evaluated based on the following evaluation criteria.

[Evaluation Criteria of Appearance]

Good: The test sample had no abnormality.

Bad: The test sample was scratched or the film thereof was peeled.

[Evaluation Criteria of Removability of Scale]

Good: Scale could be cleaned and removed. No scratch was found.

Bad: Scale remained or some scratches were found.

<Resistance to Hair Dye>

Bigen Men's SPEEDY IIS (available from Hoyu Co., Ltd.) was applied to a test sample, and the test sample was left to stand for 24 hours. The test sample was washed with water, and was wiped with a clean cloth. Then, the test sample was visually observed and was evaluated based on the following evaluation criteria.

[Evaluation Criteria]

Good: The test sample had no abnormality.

Bad: The test sample was dyed.

<Reflection Hue>

In the case of a mirror, a test sample was measured for the 5° regular reflectance spectrum using UV-Visible/NIR Spectrophotometer UH4150 (available from Hitachi High-Tech Science Corporation) within the rage of from 340 nm to 800 nm, followed by calculating the reflection a* and the reflection b*.

Example 1

<Substrate for Wet Area>

For a substrate for wet area, a mirror used in a bathroom (mirror where a film of silver had been formed on a float plate glass, average thickness of 5 mm, substrate No. A) was used.

<Formation of Primer Resin Layer>

Each active energy ray-curable resin composition having formulation presented in Table 2-1-1 was coated on the substrate for wet area so that the average thickness after drying and curing would be 4 μm. After coating, the active energy ray-curable resin composition was dried in an oven of 80° C. for 2 minutes. A metal halide lamp was used to emit ultraviolet rays at a radiation dose of 500 mJ/cm$^2$ in the air atmosphere to form a primer resin layer.

<Formation of Anti-Fogging and Anti-Fouling Layer>

Each active energy ray-curable resin composition having formulation presented in Table 2-1-1 was coated on the primer resin layer so that the average thickness after drying and curing would be 4 μm. After coating, the active energy ray-curable resin composition was dried in an oven of 80° C. for 2 minutes. A metal halide lamp was used to emit ultraviolet rays at a radiation dose of 500 mJ/cm$^2$ in a nitrogen atmosphere (oxygen concentration of less than 1.0% by volume), followed by curing an anti-fogging and anti-fouling layer, to obtain an anti-fogging and anti-fouling laminate.

The prepared anti-fogging and anti-fouling laminate was evaluated as described above. Results are presented in Table 2-1-1.

Example 2

An anti-fogging and anti-fouling laminate was obtained in the same manner as in Example 1 except that the formulations of the active energy ray-curable resin compositions and the film thickness of each layer were changed to those presented in Table 2-1-1.

The prepared anti-fogging and anti-fouling laminate was evaluated as described above. Results are presented in Table 2-1-1.

Example 3

The substrate for wet area in Example 1 was changed to an ABS plate (thickness=3 mm) (substrate No. B) used for washing metallic fittings, which had been subjected to a nickel chromium plating.

In addition, the formulations of the active energy ray-curable resin compositions in Example 1 were changed to those presented in Table 2-1-1.

An anti-fogging and anti-fouling laminate was obtained in the same manner as in Example 1 except for the above.

The prepared anti-fogging and anti-fouling laminate was evaluated as described above. Results are presented in Table 2-1-1.

Example 4

The substrate for wet area in Example 1 was changed to a PMMA plate (thickness=3 mm) (substrate No. C) used for a door surface material of a bathroom.

Furthermore, the primer resin layer was not formed, and the formulation of the active energy ray-curable resin composition of which the anti-fogging and anti-fouling layer was formed and the film thickness of the anti-fogging and anti-fouling layer were changed to those presented in Table 2-1-2.

An anti-fogging and anti-fouling laminate was obtained in the same manner as in Example 1 except for the above.

The prepared anti-fogging and anti-fouling laminate was evaluated as described above. Results are presented in Table 2-1-2.

Example 5

The substrate for wet area in Example 1 was changed to an m-PPE plate (thickness=3 mm) (substrate No. D) used for a toilet seat member.

Furthermore, the primer resin layer was not formed, and the formulation of the active energy ray-curable resin composition of which the anti-fogging and anti-fouling layer was formed and the film thickness of the anti-fogging and anti-fouling layer were changed to those presented in Table 2-1-2.

An anti-fogging and anti-fouling laminate was obtained in the same manner as in Example 1 except for the above.

The prepared anti-fogging and anti-fouling laminate was evaluated as described above. Results are presented in Table 2-1-2.

Example 6

The substrate for wet area in Example 1 was changed to an m-PPE plate (thickness=3 mm) (substrate No. E) used for a toilet seat member.

Furthermore, the primer resin layer was not formed, and the formulation of the active energy ray-curable resin composition of which the anti-fogging and anti-fouling layer was formed and the film thickness of the anti-fogging and anti-fouling layer were changed to those presented in Table 2-1-2.

An anti-fogging and anti-fouling laminate was obtained in the same manner as in Example 1 except for the above.

The prepared anti-fogging and anti-fouling laminate was evaluated as described above. Results are presented in Table 2-1-2.

Comparative Examples 1 and 2

Each anti-fogging and anti-fouling laminate was obtained in the same manner as in Example 1 except that the formulations of the active energy ray-curable resin compositions were changed to those presented in Table 2-2.

The prepared anti-fogging and anti-fouling laminate was evaluated as described above. Results are presented in Table 2-2.

Comparative Example 3

The mirror used in a bathroom (mirror where a film of silver had been formed on a float plate glass, average thickness of 5 mm) (substrate No. A), which was used in Example 1, was evaluated without forming the primer layer and the anti-fogging and anti-fouling layer. Results are presented in Table 2-2.

Comparative Example 4

A DLC-coated mirror used in a bathroom (thickness=5 mm) (No. F) was evaluated. Results are presented in Table 2-3-1.

Comparative Example 5

A mirror (thickness=5 mm) (No. G) used in a bathroom, which had been coated with a fluorine-containing silane coupling agent, was evaluated. Results are presented in Table 2-3-1.

Comparative Example 6

A mirror (thickness=5 mm) (No. H) used in a bathroom, which had been coated with a metallic oxide filler, was evaluated. Results are presented in Table 2-3-1.

Comparative Example 7

The ABS plate used in Example 2 (thickness=3 mm) (substrate No. B) used for washing metallic fittings, which had been subjected to a nickel chromium plating, was evaluated without forming the primer layer and the anti-fogging and anti-fouling layer. Results are presented in Table 2-3-2.

Comparative Example 8

A PET film (No. I) used in a washroom or bathroom, which had been coated with a hydrophilic resin, was evaluated. Results are presented in Table 2-3-2.

Comparative Example 9

A PET film (No. J) used in a washroom or bathroom, which had been coated with a water-absorbable resin, was evaluated. Results are presented in Table 2-3-2.

TABLE 2-1-1

| Active energy ray-curable resin composition | | | Ex. 1 | Ex. 2 | Ex. 3 |
|---|---|---|---|---|---|
| Anti-fogging and anti-fouling layer (part(s) by mass) | Hydrophilic monomer | BYK-UV3535 | 0.3 | — | 0.1 |
| | | FTERGENT 681 | — | 0.5 | — |
| | Hydrophobic monomer | Fclear KD3510UV | — | — | — |
| | | EBECRYL 8110 | — | — | — |

TABLE 2-1-1-continued

| | Active energy ray-curable resin composition | | Ex. 1 | Ex. 2 | Ex. 3 |
|---|---|---|---|---|---|
| | Bi-or more functional urethane acrylate | KRM8200 | 60 | — | — |
| | | MU9500 | — | 50 | — |
| | | Miramer PUG610 | — | — | — |
| | | CN975 | — | — | 70 |
| | Crosslinking agent | A-DPH | 40 | — | — |
| | | A-TMM-3 | — | 25 | — |
| | | A-DCP | — | 25 | 30 |
| | Photoinitiator | Irgacure 184 | 3 | 3 | 3 |
| | Solvent | PGME | 200 | 200 | 200 |
| Primer layer (part(s) by mass) | Presence or absence of primer layer | | Presence | Presence | Presence |
| | Urethane acrylate | UT5181 | 65 | 60 | 50 |
| | PETA | A-TMM-3L | 35 | 40 | 50 |
| | Photoinitiator | Irgacure 184 | 3 | 3 | 3 |
| | Solvent | PGME | 200 | 200 | 200 |
| Evaluation results | Substrate | | No. A | No. A | No. B |
| | Average film thickness μm | Primer layer | 4 | 4 | 4 |
| | | Anti-fogging and anti-fouling layer | 4 | 3 | 4 |
| | Adhesiveness | | 100/100 | 100/100 | 100/100 |
| | Surface free energy (mJ/m$^2$) | | 38 | 42 | 38 |
| | Water contact angle (°) | | 72 | 66 | 72 |
| | Hexadecane contact angle (°) | | 5 | 6 | 5 |
| | Martens hardness (N/mm$^2$) | | 250 | 210 | 210 |
| | Coefficient of kinetic friction | | 0.17 | 0.16 | 0.20 |
| | Visibility after shower | | Good | Good | — |
| | Removability of scale | | Good | Good | Good |
| | Scratch resistance | | Good | Good | Good |
| | Alkali resistance | Surface free energy (mJ/m$^2$) | 56 | 54 | 55 |
| | | Water contact angle (°) | 44 | 47 | 46 |
| | | Hexadecane contact angle (°) | 6 | 5 | 5 |
| | | Coefficient of kinetic friction | 0.69 | 0.63 | 0.68 |
| | | Appearance | Good | Good | Good |
| | | Removability of scale | Good | Good | Good |
| | Resistance to hair dye | | Good | Good | Good |
| | Reflection hue | Reflection a* | −2.7 | −2.7 | — |
| | | Reflection b* | 2.1 | 2.1 | — |

TABLE 2-1-2

| | Active energy ray-curable resin composition | | Ex. 4 | Ex. 5 | Ex. 6 |
|---|---|---|---|---|---|
| Anti-fogging and anti-fouling layer (part(s) by mass) | Hydrophilic monomer | BYK-UV3535 | — | 1 | — |
| | | FTERGENT 681 | 0.01 | — | 0.3 |
| | Hydrophobic monomer | Fclear KD3510UV | — | — | — |
| | | EBECRYL 8110 | — | — | — |
| | Bi-or more functional urethane acrylate | KRM8200 | 80 | — | — |
| | | MU9500 | — | — | — |
| | | Miramer PU610 | — | 90 | 55 |
| | | CN975 | — | — | — |
| | Crosslinking agent | A-DPH | 20 | — | — |
| | | A-TMM-3 | — | — | 20 |
| | | A-DCP | — | 10 | 25 |
| | Photoinitiator | Irgacure 184 | 3 | 3 | 3 |
| | Solvent | PGME | 200 | 200 | 200 |
| Primer layer (part(s) by mass) | Presence or absence of primer layer | | Absence | Absence | Absence |
| | Urethane acrylate | UT5181 | — | — | — |
| | PETA | A-TMM-3L | — | — | — |
| | Photoinitiator | Irgacure 184 | — | — | — |
| | Solvent | PGME | — | — | — |
| Evaluation results | Substrate | | No. C | No. D | No. E |
| | Average film thickness μm | Primer layer | — | — | — |
| | | Anti-fogging and anti-fouling layer | 6 | 1 | 4 |
| | Adhesiveness | | 100/100 | 100/100 | 100/100 |
| | Surface free energy (mJ/m$^2$) | | 42 | 38 | 42 |
| | Water contact angle (°) | | 66 | 72 | 66 |
| | Hexadecane contact angle (°) | | 6 | 5 | 6 |
| | Martens hardness (N/mm$^2$) | | 230 | 230 | 210 |
| | Coefficient of kinetic friction | | 0.17 | 0.16 | 0.16 |
| | Visibility after shower | | — | — | — |

TABLE 2-1-2-continued

| Active energy ray-curable resin composition | | Ex. 4 | Ex. 5 | Ex. 6 |
|---|---|---|---|---|
| Removability of scale | | Good | Good | Good |
| Scratch resistance | | Good | Good | Good |
| Alkali resistance | Surface free energy (mJ/m$^2$) | 55 | 56 | 54 |
| | Water contact angle (°) | 46 | 45 | 47 |
| | Hexa decane contact angle (°) | 5 | 6 | 5 |
| | Coefficient of kinetic friction | 0.65 | 0.66 | 0.70 |
| | Appearance | Good | Good | Good |
| | Removability of scale | Good | Good | Good |
| Resistance to hair dye | | Good | Good | Good |
| Reflection hue | Reflection a* | — | — | — |
| | Reflection b* | — | — | — |

TABLE 2-2

| | Active energy ray-curable resin composition | | Comp. Ex. 1 | Comp. Ex. 2 | Comp. Ex. 3 |
|---|---|---|---|---|---|
| Anti-fogging and anti-fouling layer (part(s) by mass) | Hydrophilic monomer | BYK-UV3535 | — | — | — |
| | | FTERGENT 681 | — | — | — |
| | Hydrophobic monomer | Fclear KD3510UV | 1 | — | — |
| | | EBECRYL 8110 | — | 1 | — |
| | Bi-or more functional urethane acrylate | KRM8200 | 65 | 60 | — |
| | | MU9500 | — | — | — |
| | | Miramer PUG610 | — | — | — |
| | | CN975 | — | — | — |
| | Crosslinking agent | A-DPH | — | 40 | — |
| | | A-TMM-3 | 35 | — | — |
| | | A-DCP | — | — | — |
| | Photoinitiator | Irgacure 184 | 3 | 3 | — |
| | Solvent | PGME | 200 | 200 | — |
| Primer layer (part(s) by mass) | Presence or absence of primer layer | | Presence | Presence | — |
| | Urethane acrylate | UT5181 | 70 | 65 | — |
| | PETA | A-TMM-3L | 30 | 35 | — |
| | Photoinitiator | Irgacure 184 | 3 | 3 | — |
| | Solvent | PGME | 200 | 200 | — |
| Evaluation results | Substrate | | No. A | No. A | No. A |
| | Average film thickness μm | Primer layer | 4 | 4 | — |
| | | Anti-fogging and anti-fouling layer | 4 | 4 | — |
| | Adhesiveness | | 100/100 | 100/100 | — |
| | Surface free energy (mJ/m$^2$) | | 26 | 14 | — |
| | Water contact angle (°) | | 96 | 111 | — |
| | Hexadecane contact angle (°) | | 28 | 67 | — |
| | Martens hardness (N/mm$^2$) | | 240 | 250 | 3,400 |
| | Coefficient of kinetic friction | | 0.31 | 0.22 | 0.90 |
| | Visibility after shower | | Bad | Bad | Good |
| | Removability of scale | | Good | Good | Bad |
| | Scratch resistance | | Good | Good | Good |
| | Alkali resistance | Surface free energy (mJ/m$^2$) | — | — | — |
| | | Water contact angle (°) | 66 | 79 | — |
| | | Hexadecane contact angle (°) | — | — | — |
| | | Coefficient of kinetic friction | — | — | — |
| | | Appearance | Good | Good | Good |
| | | Removability of scale | Bad | Bad | Bad |
| | Resistance to hair dye | | Good | Good | Good |
| | Reflection hue | Reflection a* | −2.7 | −2.7 | −2.9 |
| | | Reflection b* | 2.1 | 2.1 | 2.0 |

TABLE 2-3-1

| | | | Comp. Ex. 4 No. F Mirror coated with DLC | Comp. Ex. 5 No. G Mirror coated with fluorine-containing silane coupling agent | Comp. Ex. 6 No. H Mirror coated with metallic oxide filler |
|---|---|---|---|---|---|
| Evaluation results | Average film thickness μm | Anti-fouling layer | — | — | — |
| | Adhesiveness | | 100/100 | 100/100 | 100/100 |
| | Surface free energy (mJ/m$^2$) | | 40 | 14 | 64 |
| | Water contact angle (°) | | 69 | 111 | 31 |

TABLE 2-3-1-continued

|  |  | Comp. Ex. 4 No. F Mirror coated with DLC | Comp. Ex. 5 No. G Mirror coated with fluorine-containing silane coupling agent | Comp. Ex. 6 No. H Mirror coated with metallic oxide filler |
|---|---|---|---|---|
| Hexadecane contact angle (°) | | 8 | 69 | 4 |
| Martens hardness (N/mm$^2$) | | 3,600 | 3,400 | — |
| Coefficient of kinetic friction | | 0.77 | 0.076 | 0.59 |
| Visibility after shower | | Good | Bad | Good |
| Removability of scale | | Good | Good | Bad |
| Scratch resistance | | Good | Good | Good |
| Alkali resistance | Surface free energy (mJ/m$^2$) | 69 | 29 | — |
| | Water contact angle (°) | 21 | 79 | — |
| | Hexadecane contact angle (°) | 5 | 48 | — |
| | Coefficient of kinetic friction | 1.7 | — | — |
| | Appearance | Good | Good | Good |
| | Removability of scale | Bad | Bad | Bad |
| Resistance to hail dye | | Good | Good | Good |
| Reflection hue | Reflection a* | −1.9 | −2.7 | −2.7 |
| | Reflection b* | 7.9 | 2.1 | 2.0 |

TABLE 2-3-2

|  |  |  | Comp. Ex. 7 No. B ABS plate subjected to nickel chromium plating | Comp. Ex. 8 No. I PET film coated with hydrophilic resin | Comp. Ex. 9 No. J PET film coated with water-absorbable resin |
|---|---|---|---|---|---|
| Evaluation results | Average film thickness μm | Anti-fouling layer | — | 3 | 8 |
| | Adhesiveness | | — | 100/100 | 100/100 |
| | Surface free energy (mJ/m$^2$) | | 44 | 66 | 55 |
| | Water contact angle (°) | | 62 | 26 | 43 |
| | Hexadecane contact angle (°) | | 4 | 12 | 5 |
| | Martens hardness (N/mm$^2$) | | 5,300 | — | 50 |
| | Coefficient of kinetic friction | | 0.10 | 0.24 | 0.52 |
| | Visibility after shower | | — | — | — |
| | Removability of scale | | Bad | Bad | Bad |
| | Scratch resistance | | Good | Good | Bad |
| | Alkali resistance | Surface free energy (mJ/m2) | — | — | — |
| | | Water contact angle (°) | — | — | — |
| | | Hexadecane contact angle (°) | — | — | — |
| | | Coefficient of kinetic friction | — | — | — |
| | | Appearance | Good | Good | Bad |
| | | Removability of scale | Bad | Bad | Bad |
| | Resistance to hair dye | | Good | Good | Bad |
| | Reflection hue | Reflection a* | — | — | — |
| | | Reflection b* | — | — | — |

Details of the substrates are as follows.

Substrate for wet area No. A: Mirror where a film of silver had been formed on a float plate glass, average thickness of 5 mm Substrate for wet area No. B: ABS plate (thickness=3 mm) used for washing metallic fittings, which had been subjected to a nickel chromium plating (ABS: Acrylonitrile-Butadiene-Styrene Copolymer Resin)

Substrate for wet area No. C: PMMA plate (thickness=3 mm) used for a door surface material for a bathroom (PMMA: Polymethyl Methacrylate)

Substrate for wet area No. D: m-PPE plate (thickness=3 mm) used for a toilet seat member (m-PPE: Modified Polyphenylene Ether)

Substrate for wet area No. E: ABS plate (thickness=3 mm) used for a toilet seat member Details of mirrors and the like evaluated in Comparative Examples are as follows.

No. F: DLC-coated mirror (thickness=5 mm) used in a bathroom

No. G: Mirror (thickness=5 mm) used in a bathroom, which had been coated with a fluorine-containing silane coupling agent No. H: Mirror (thickness=5 mm) used in a bathroom, which had been coated with a metallic oxide filler No. I: PET film used in a washroom or bathroom, which had been coated with a hydrophilic resin No. J: PET film used in a washroom or bathroom, which had been coated with a water-absorbable resin Details of the materials described in Tables 2-1-1, 2-1-2, and 2-2 are as follows.

<Anti-Fogging and Anti-Fouling Layer Material>

«Hydrophilic Monomer»

BYK-UV3535: UV reactive group-containing modified polyether, silicone-free, available from BYK FTERGENT 681: Oligomer containing a fluorine-containing group, a hydrophilic group/lipophilic group, and a UV reactive group, available from NEOS COMPANY LIMITED «Hydrophobic Monomer»
    Fclear KD3510UV: Fluorine-containing group, UV reactive group-containing compound, available from KANTO DENKA KOGYO CO., LTD.
    EBECRYL 8110: Fluorine-containing group, UV reactive group-containing compound, available from DAICEL-ALLNEX LTD.
«Bi- or More Functional Urethane Acrylate»
    KRM8200: Aliphatic urethane acrylate, available from DAICEL-ALLNEX LTD.
    MU9500: Aliphatic urethane acrylate, available from Miwon Specialty Chemical
    Miramer PU610: Aliphatic urethane acrylate, available from Miwon Specialty Chemical
    CN975: Aromatic urethane acrylate, available from SARTOMER
«Crosslinking Agent»
    A-DPH: Dipentaerythritol hexaacrylate, available from Shin Nakamura Chemical Co., Ltd.
    A-TMM-3: Pentaerythritol triacrylate (triester: 37%), available from Shin Nakamura Chemical Co., Ltd.
    A-DCP: Tricyclodecane dimethanol diacrylate, available from Shin Nakamura Chemical Co., Ltd.
«Photoinitiator»
    Irgacure 184: Available from BASF
«Solvent»
    PGME: propylene glycol monomethylether
<Primer Resin Layer Material>
«Urethane Acrylate»
    UT5181: Available from Nippon Synthetic Chemical Industry Co., Ltd.
«PETA»
    A-TMM-3L: Available from Shin Nakamura Chemical Co., Ltd., pentaerythritol triacrylate (triester: about 55%)

The anti-fogging and anti-fouling laminates of Examples 1 to 6 were excellent in all the anti-fogging property (visibility after shower), the anti-fouling property (removability of scale), and the chemical resistance (alkali resistance and resistance to hair dye). In addition, the anti-fogging and anti-fouling laminates were also excellent in the scratch resistance.

Meanwhile, in Comparative Examples 1 and 2, the anti-fogging property (visibility after shower) and the chemical resistance (alkali resistance) were poor.

In Comparative Example 3, the anti-fouling property (removability of scale) and the chemical resistance (alkali resistance) were poor.

In Comparative Example 4, the chemical resistance (alkali resistance) was poor.

In Comparative Example 5, the anti-fogging property (visibility after shower) and the chemical resistance (alkali resistance) were poor.

In Comparative Examples 6 to 8, the anti-fouling property (removability of scale) and the chemical resistance (alkali resistance) were poor.

In Comparative Example 9, the anti-fouling property (removability of scale) and the chemical resistance (alkali resistance and resistance to hair dye) were poor.

INDUSTRIAL APPLICABILITY

The anti-fogging and anti-fouling laminate of the present invention can be suitably used in, for example, water closets, toilet seat members (e.g., toilet seats, toilet lids, nozzles, and nozzle covers), dishwashers, washing machines, kitchen sinks, members of kitchen hood, workbenches, wash basins, lavatories, bathtub main bodies, bathtub aprons, window materials, partitions, wall materials, floor materials, faucet parts, faucets, shower heads, shower bars, hoses, racks, holders, handrails, window frames, door frames, metallic fittings for drainage, drainage ports, and mirrors, which are equipment of wet areas (e.g., washrooms, bathrooms, kitchens, toilets, cookeries, and food plants).

REFERENCE SIGNS LIST 1 substrate
2 primer layer
3 anti-fogging and anti-fouling layer

The invention claimed is:
1. An anti-fogging and anti-fouling laminate comprising:
    a substrate; and
    an anti-fogging and anti-fouling layer on the substrate, the anti-fogging and anti-fouling layer having a flat surface,
    wherein a hexadecane contact angle of the anti-fogging and anti-fouling layer is 10° or less,
    the anti-fogging and anti-fouling layer is a cured product of an active energy ray-curable resin composition, and
    the active energy ray-curable resin composition includes:
    (a) a bi- or more functional urethane (meth)acrylate,
    (b) a hydrophilic monomer including a hydrophilic group and a (meth)acryloyl group, and
    (c) a bi- or more functional (meth)acrylate having an acryl equivalent of less than 400, selected from the group consisting of pentaerythritol triacrylate, trimethylolpropane triacrylate, pentaerythritol tetraacrylate, dipentaerythritol hexaacrylate, ethoxylated glycerin triacrylate, pentaerythritol alkoxy tetraacrylate, and tricyclodecane dimethanol diacrylate,
    wherein the active energy ray-curable resin composition is free of a hydrophobic monomer which does not include the hydrophilic group and has the water-repellent molecular structure, and
    wherein an amount of the hydrophilic monomer is more than 0% by mass but 10% by mass or less relative to non-volatile matter of the active energy ray-curable resin composition.

2. The anti-fogging and anti-fouling laminate according to claim 1, further comprising:
    a primer layer between the substrate and the anti-fogging and anti-fouling layer.

3. The anti-fogging and anti-fouling laminate according to claim 1,
    wherein a surface free energy of the anti-fogging and anti-fouling layer is 30 mJ/m$^2$ or more but 65 mJ/m$^2$ or less.

4. The anti-fogging and anti-fouling laminate according to claim 1,
    wherein a water contact angle of the anti-fogging and anti-fouling layer is 30° or more but 90° or less.

5. The anti-fogging and anti-fouling laminate according to claim 1,
    wherein Martens hardness of the anti-fogging and anti-fouling layer is 200 N/mm$^2$ or more.

6. The anti-fogging and anti-fouling laminate according to claim 1,
    wherein a coefficient of kinetic friction of the anti-fogging and anti-fouling layer is 0.90 or less.

7. The anti-fogging and anti-fouling laminate according to claim 1,
wherein the substrate is a mirror, and
b* value of reflection hue in the anti-fogging and anti-fouling layer is 5 or less.

8. An article comprising:
the anti-fogging and anti-fouling laminate according to claim 1 on a surface of the article.

9. A method for producing the anti-fogging and anti-fouling laminate according to claim 1, the method comprising:
irradiating an uncured layer formed of the active energy ray-curable resin composition with ultraviolet rays under an atmosphere having an oxygen concentration of less than 1.0% by volume to form the anti-fogging and anti-fouling layer.

10. An anti-fogging method comprising:
warming the anti-fogging and anti-fouling laminate according to claim 1 to a temperature equal to or higher than normal temperature to improve an anti-fogging property of the anti-fogging and anti-fouling layer.

11. An anti-fogging method comprising:
cleaning the anti-fogging and anti-fouling layer of the anti-fogging and anti-fouling laminate according to claim 1 to maintain an anti-fogging property of the anti-fogging and anti-fouling layer.

12. An active energy ray-curable resin composition comprising:
(a) a bi- or more functional urethane (meth)acrylate,
(b) a hydrophilic monomer including a hydrophilic group and a (meth)acryloyl group, and
(c) a bi- or more functional (meth)acrylate having an acryl equivalent of less than 400, selected from the group consisting of pentaerythritol triacrylate, trimethylolpropane triacrylate, pentaerythritol tetraacrylate, dipentaerythritol hexaacrylate, ethoxylated glycerin triacrylate, pentaerythritol alkoxy tetraacrylate, and tricylodecane dimethanol diacrylate,
wherein the active energy ray-curable resin composition is free of a hydrophobic monomer which does not include the hydrophilic group and has the water-repellent molecular structure, and
an amount of the hydrophilic monomer is more than 0% by mass but 10% by mass or less relative to non-volatile matter of the active energy ray-curable resin composition.

13. The active energy ray-curable resin composition according to claim 12,
wherein an anti-fogging and anti-fouling layer having a flat surface, which is obtained by curing the active energy ray-curable resin composition with active energy rays, has a hexadecane contact angle of 10° or less.

14. The active energy ray-curable resin composition according to claim 12,
wherein an anti-fogging and anti-fouling layer having a flat surface, which is obtained by curing the active energy ray-curable resin composition with active energy rays, has a surface free energy of 30 mJ/m$^2$ or more but 65 mJ/m$^2$ or less.

15. The active energy ray-curable resin composition according to claim 12,
wherein an anti-fogging and anti-fouling layer having a flat surface, which is obtained by curing the active energy ray-curable resin composition with active energy rays, has a water contact angle of 30° or more but 90° or less.

16. The active energy ray-curable resin composition according to claim 12,
wherein an anti-fogging and anti-fouling layer having a flat surface, which is obtained by curing the active energy ray-curable resin composition with active energy rays, has Martens hardness of 200 N/mm$^2$ or more.

17. The active energy ray-curable resin composition according to claim 12,
wherein an anti-fogging and anti-fouling layer having a flat surface, which is obtained by curing the active energy ray-curable resin composition with active energy rays, has a coefficient of kinetic friction of 0.90 or less.

18. The active energy ray-curable resin composition according to claim 12,
wherein b* value of reflection hue in an anti-fogging and anti-fouling layer having a flat surface is 5 or less, the anti-fogging and anti-fouling layer being obtained by curing the active energy ray-curable resin composition on a mirror that is a substrate with active energy rays.

* * * * *